United States Patent
Kam et al.

(10) Patent No.: US 6,754,208 B2
(45) Date of Patent: Jun. 22, 2004

(54) TRAFFIC SPREADING TO REDUCE BLOCKING IN A GROOMED CLOS COMMUNICATION SWITCH

(75) Inventors: Anthony Chi-Kong Kam, Cambridge, MA (US); Naimish Patel, North Andover, MA (US)

(73) Assignee: Sycamore Networks, Inc., Chelmsford, MA (US)

( * ) Notice: Subject to any disclaimer, the term of this patent is extended or adjusted under 35 U.S.C. 154(b) by 368 days.

(21) Appl. No.: 09/920,434

(22) Filed: Aug. 1, 2001

(65) Prior Publication Data

US 2002/0146003 A1 Oct. 10, 2002

Related U.S. Application Data

(60) Provisional application No. 60/277,063, filed on Mar. 19, 2001.

(51) Int. Cl.[7] ................................................. H04Q 1/00
(52) U.S. Cl. ........................ 370/388; 370/386; 370/369; 340/2.6
(58) Field of Search ................................. 370/388, 386, 370/356, 369, 360; 340/2.6; 398/82; 385/17

(56) References Cited

U.S. PATENT DOCUMENTS

| | | | | |
|---|---|---|---|---|
| 5,987,027 A | * | 11/1999 | Park et al. | 370/360 |
| 6,128,292 A | * | 10/2000 | Kim et al. | 370/356 |
| 6,606,427 B1 | * | 8/2003 | Graves et al. | 385/17 |
| 2002/0093952 A1 | * | 7/2002 | Gonda | 370/369 |
| 2002/0141013 A1 | * | 10/2002 | Patel et al. | 398/82 |

* cited by examiner

Primary Examiner—Edwin C. Holloway, III
(74) Attorney, Agent, or Firm—Weingarten, Schurgin, Gagnebin & Lebovici LLP (57) ABSTRACT

A method and apparatus are disclosed for spreading the component signals of a groomed input circuit through a three-stage CLOS switch network. The spreading algorithm includes sequentially evaluating each midstage switching module as to the availability of a connection between an assigned source switching module and an assigned destination switching module having sufficient spare bandwidth to accommodate one or more of the component signals. A load sharing algorithm can be used to spread the component signals among the midstage switching stages. In this way the available bandwidth of each of the midstage switching modules is evaluated for each of the component signals and each component signal is routed through the midstage switching module having the largest available bandwidth.

25 Claims, 5 Drawing Sheets

TRAFFIC SPREADING TO REDUCE BLOCKING IN A GROOMED CLOS COMMUNICATION SWITCH

CROSS REFERENCE TO RELATED APPLICATIONS

This application claims priority under 35 U.S.C. § 119(e) to provisional patent application serial No. 60/277,063 filed Mar. 19, 2001, the disclosure of which is hereby incorporated by reference.

STATEMENT REGARDING FEDERALLY SPONSORED RESEARCH OR DEVELOPMENT

N/A

BACKGROUND OF THE INVENTION

Figure 1:
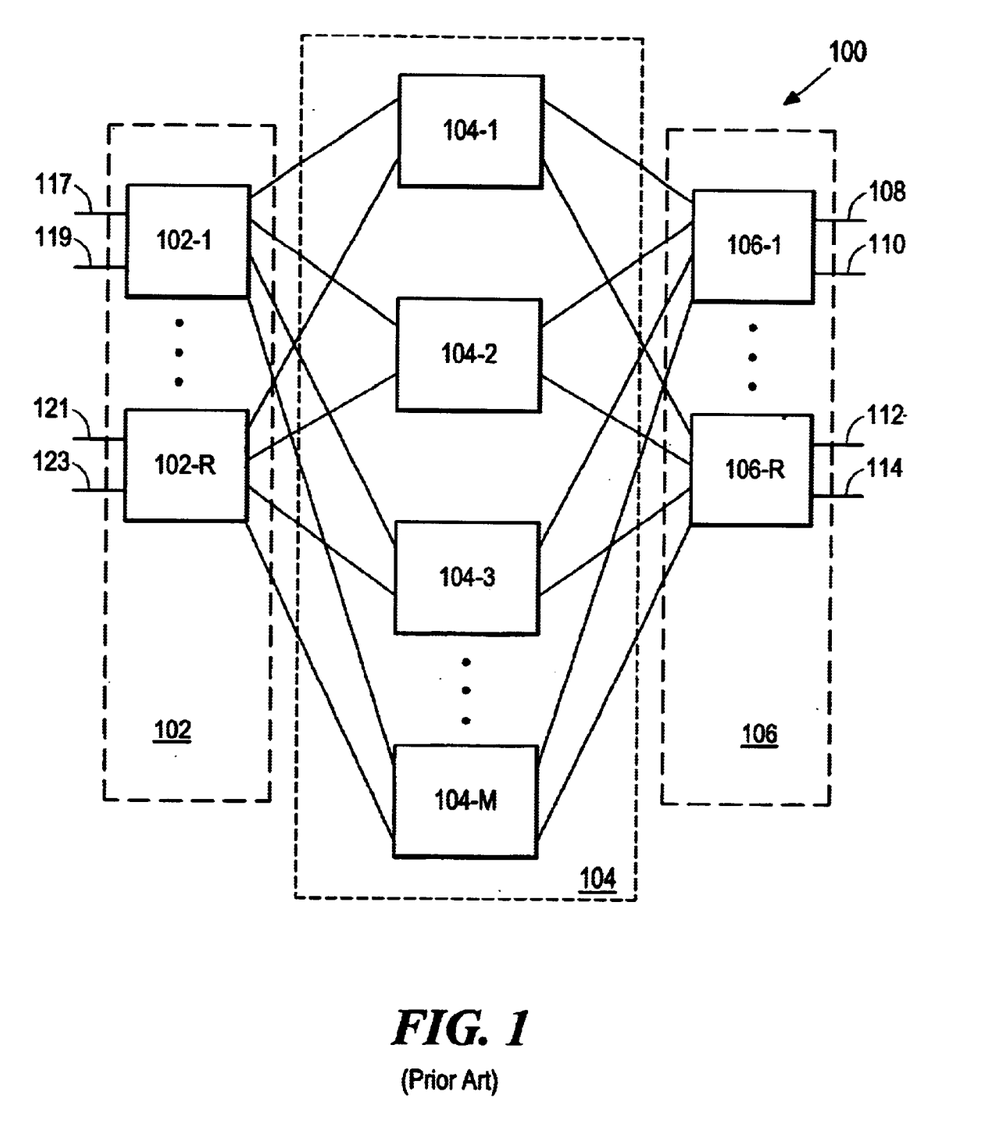
FIG. 1 is a schematic block diagram of an exemplary prior art 3-stage CLOS network.

CLOS networks, which are 3-stage unidirectional switching networks, are well known in the art. As depicted in FIG. 1, a typical CLOS network 100 includes a source stage 102 that includes a plurality of R source modules 102-1 to 102-R, wherein each source switching module is a N×M switch, which may be a crossbar switch. The M output ports of the R source modules are connected to the input ports of a midstage switching stage 104. The midstage switching stage 104 includes M midstage switching modules 104-1 to 104-M each having R input ports, wherein each of the midstage switching modules 104 is an R×R switch, which may be a crossbar switch. The R output ports of the midstage switching modules are connected to the input ports of a destination stage 106. The destination stage 106 includes R destination modules, 106-1 to 106-R wherein each of the R destination modules is an M×N switch, which may be a crossbar switch. Thus, for each of the R source modules 102 there is exactly one connection, i.e., one unit of edge capacity, between the source module and any midstage switching module. Similarly, there is exactly one connection, i.e., one unit of edge capacity, between each of the M midstage switching modules and each of the R destination modules.

As used herein an input circuit is an input signal having one or more component signals. An input circuit typically is applied or allocated to an input port on one of the source switching modules. A unicast input circuit is an input circuit that has a single source port and a single destination port. A dualcast input circuit is an input circuit that has a single source port and two destination ports on one or more destination switching modules, and a multicast input circuit is an input circuit that has a single source port and more than two destination ports on one or more switching modules.

A 3-stage CLOS network is strict sense non-blocking when carrying unicast circuits when there is no need to re-route any existing circuits to allow the switching of a new input circuit from the desired source module to the desired destination module. A sufficient condition for strict sense non-blocking of unicast input circuits is that the number of output ports per source switching module and therefore the number of midstage switching modules M is greater than or equal to 2 times the number of input ports per source module minus 1, or $M \geq 2*N-1$.

A 3-stage CLOS network is considered reconfigurably non-blocking when carrying unicast circuits when to accommodate a new input circuit, existing circuits may have to be re-routed within the CLOS network. A sufficient condition for unicast reconfigurably non-blocking is that the number of midstage switching modules is greater than or equal to the number of input ports on a source module, or $M \geq N$.

A 3-stage CLOS network is strict sense non-blocking when carrying dualcast circuits when there is no need to re-route any existing circuits to allow the switching of a new input circuit from the desired source module to the desired destination modules. A sufficient condition for dualcast strict sense non-blocking is that the number of output ports per source switching module, and therefore the number of midstage switching modules, M is greater than or equal to 3 times the number of input ports per source module minus 2, or $M \geq 3*N-2$.

A 3-stage CLOS network is considered reconfigurably non-blocking when carrying dualcast circuits when to accommodate a new input circuit an existing circuit may have to be re-routed within the CLOS network. A sufficient condition for dualcast reconfigurably non-blocking is that the number of midstage switching modules is greater than or equal to twice the number of input ports on a source module, or $M \geq 2N$. A necessary condition for dualcast reconfigurably nonblocking is that the number of midstage switching modules is greater than or equal to four-thirds times the number of input ports on a source module, or $M \geq 4N/3$.

Typically, CLOS networks may have several hundred input ports distributed among tens or hundreds of source modules. To provide a suitable quality of connectivity the CLOS network should be configured to be at least reconfigurably nonblocking. However, as the size of the CLOS network grows, reconfiguring the CLOS network involves coordinating switchovers in all three switching stages. This recoordination is time consuming and may lead to traffic disruptions resulting in loss of data. For example re-routing an existing circuit may result in traffic disruptions that are greater than 50 ms. Therefore, creating a system that is reconfigurably nonblocking is not an efficient network architecture and can be disruptive to the traffic carried thereon. As discussed above, to ensure strict sense non-blocking for large CLOS networks, the required number of midstage switching modules must increase at twice to three times the rate as the number of input ports. This can lead to large, expensive, and complex switching systems.

Therefore it would be desirable to provide a 3-stage CLOS network that is not as large and complex as a strict sense non-blocking network, does not require reconfiguration as a reconfigurable non-blocking network, but provides a suitably low blocking probability of a circuit.

BRIEF SUMMARY OF THE INVENTION

A method and apparatus are disclosed for spreading an input circuit through a three-stage CLOS network such that the CLOS network has an extremely small blocking probability. In one embodiment, a method is provided that includes receiving an incoming input circuit that includes a plurality of component signals and also has associated therewith a source and destination identifier. Each component signal has further associated therewith a bandwidth requirement. The input circuit is allocated to one of a plurality of source switching modules that corresponds to the source identifier associated with the input circuit. At least two of the component signals are to be spread over the various midstage switching modules. As such, an ordered list is made that includes each of the midstage switching modules, and each midstage switching module is evaluated in order to identify a first midstage switching module that has a first connection to the source switching module corresponding to the source identifier, and a second connection to the destination switching module corresponding to the destination identifier. If both the first and second connections have sufficient spare bandwidth to accommodate the bandwidth of the first component signal, the first component signal is routed through the first midstage switching module. The search for a second midstage switching module to route the second component signal through begins with the next midstage switching module in the ordered list. Each midstage switching module is again evaluated to identify a second midstage switching module that has a first connection to the source switching module corresponding to the source identifier, and a second connection to the destination switching module corresponding to the destination identifier. If both the first and second connections have sufficient spare bandwidth to accommodate the bandwidth of the second component signal, the second component signal is routed through the second midstage switching module.

In one embodiment, if the search for a second midstage switching module has reached the last midstage switching module in the ordered list and not all of the midstage switching modules have been evaluated, the search for a second midstage switching module continues from the first midstage switching module of the ordered list and will continue up to and including the first midstage switching module.

An input circuit that is be a multicast circuit includes two or more identified destinations for a single identified source. A dualcast circuit is a multicast circuit having two identified destinations for a single identified source. These multicast circuits must be split at either the first or second switching module to arrive at the various identified destinations.

In one embodiment in which dualcast or multi-cast circuits are input to the CLOS network the splitting of the multicast or dualcast signals can be performed either at the source switching module or the midstage switching module or a combination of source stage spreading and midstage spreading may be employed. These may be employed with the other spreading and load balancing techniques discussed in more detail below.

BRIEF DESCRIPTION OF THE SEVERAL VIEWS OF THE DRAWING

The invention will be more fully understood by reference to the following Detailed Description of the Invention in conjunction with the drawings of which.

DETAILED DESCRIPTION OF THE INVENTION

A three-stage CLOS network is disclosed that provides for non-blocking routing of one or more groomed input circuits. An input circuit is an input signal having one or more component signals. An input circuit is groomed if two or more of the component signals comprising the input circuit are visible and able to be separated from the circuit and manipulated and switched individually. Each groomed input circuit has associated therewith source and destination identifiers that uniquely identify a source switching module and a destination switching module that the input circuit is to pass through. The associated source and destination identifiers may be maintained by a switch management system (not shown) or other switch control system. The component signals of each of the groomed input circuits are connected by the source switching module to one or more midstage switching modules, thus spreading the component signals among the midstage switching modules. The component signals are provided to the appropriate destination switching module over one or more connections and are then recombined by the destination switching module into the original circuit.

As used herein, an input circuit is a unicast input circuit if the input circuit has a source identifier and only a single destination identifier associated therewith. An input circuit is a dualcast circuit if there is a single source identifier and two destination identifiers associated therewith, and an input circuit is a multicast circuit if there is a single source identifier and three or more destination identifiers associated therewith.

Since the source switching module and the destination module are defined for a given input circuit and the component signals associated therewith, the route any component signal navigates as it traverses through a CLOS network is completely defined by the midstage switching module selected to carry the component signal. For a groomed circuit, the component signals may be routed together through the same midstage switching module. Alternatively, the groomed component signals may be individually routed through a plurality of various midstage switching modules, via connections of varying bandwidths. At the destination switching module the plurality of component signals are switched to the desired output port and de-groomed or recombined to form the original circuit. As will be described in greater detail below, routing the groomed component signals through a plurality of lower bandwidth links via one or more midstage switching modules can provide improved network connectivity without reconfiguration.

Figure 2:
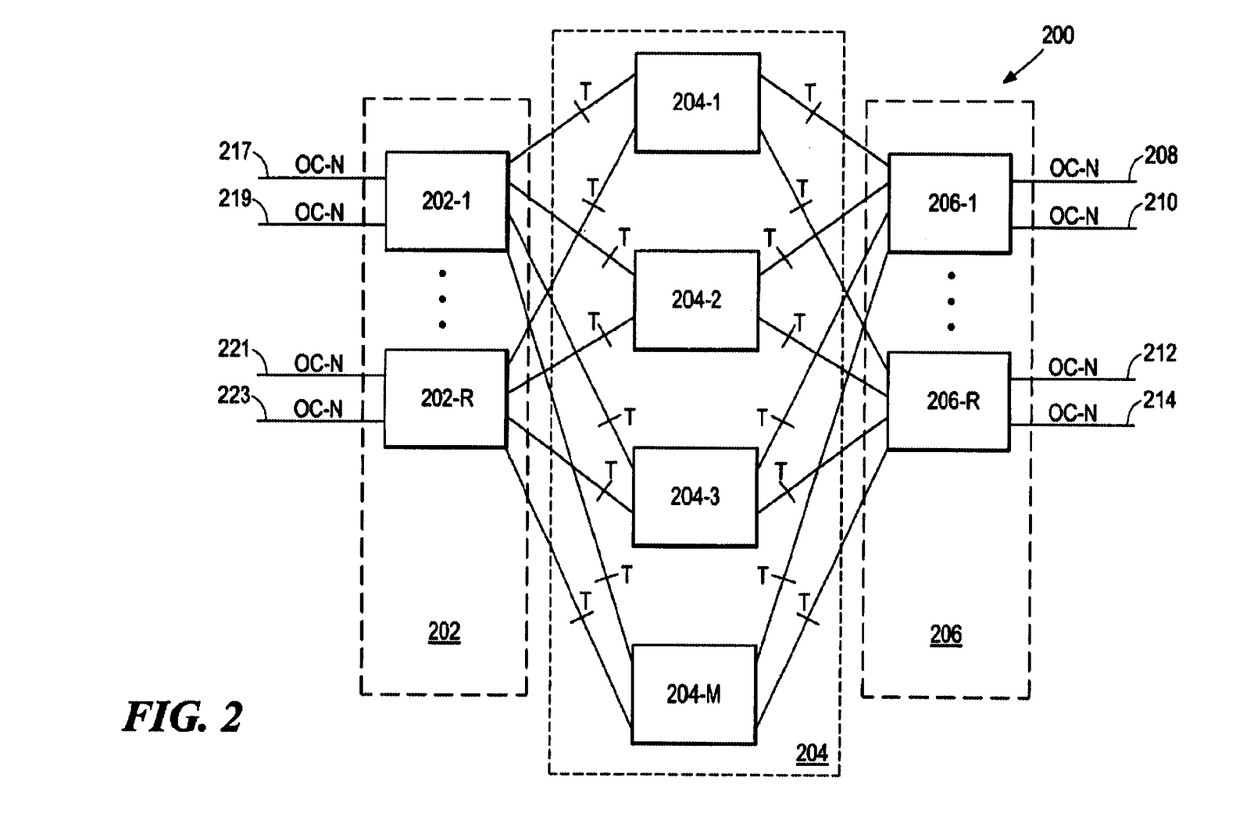
FIG. 2 is a schematic block diagram of a 3-stage CLOS network suitable for use with the present invention.

FIG. 2 illustrates an embodiment of a 3-stage CLOS network 200 that is suitable for spreading a groomed input circuit through a plurality of midstage switching modules. Although this description refers to a SONET OC-N signal, it should be recognized that this is for exemplary purposes only and that the disclosed techniques are applicable to any input signal having multiple components. The CLOS network 200 includes an input switching stage 202 that includes R grooming switching modules 202-1 to 202-R. Each of the R grooming source switching modules 202-1 to 202-R receives a plurality of inputs of OC-N signals. In the illustrated embodiment, grooming switching module 201-1 receives inputs 217, 219 and grooming switching module 201-R receives inputs 221, 223. Each input receives an OC-N input circuit. Associated with each input circuit is a source switching module and a destination switching module that the circuit is to be routed through. This association may be maintained by a separate network management system (not shown).

The input OC-N circuits can be any synchronized digital signal such as an OC-48, OC-192, or other optical OC-N signal. The R grooming switching modules 202-1 to 202-R separate the input signals into a plurality of component signals. For example, an input signal that is an OC-N signal could be divided by the grooming switching modules 202-1 to 202-R into a plurality of groups of component signals.

These plurality of groups of component signals may include groups having any integer number of component signals therein. For example an OC-48 signal could be groomed to 4 groups of OC-12 signals, 16 groups of OC-3 signals, or to a granularity as small as 48 OC-1 signals. In addition, the input signals may also be dualcast or multicast signals by virtue of being part of a dualcast or multicast circuit as described above.

Each of the plurality of R source switching modules 202-1 to 202-R in the source switching stage 202 is a L×M switch, wherein each of the L inputs and M outputs of the switching stage 202 includes T accessible ports. In addition, each R source switching module 202-1 to 202-R in the source switching stage 202 can connect any input port to any output port. Thus, each of the L inputs and M outputs of each source switching module 202-1 to 202-R can be thought of as a single connection in which T signals may be individually multiplexed, or as T individual links to be switched to any of the various midstage switching modules. It is important to note that each of the T accessible links, whether as a multiplexed part of a whole interconnection or as an individual link has a sufficient bandwidth to transmit the bandwidth of at least one of the groomed group of component signals. In the case of the original OC-N input circuits being groomed into K components, then each of the T connections has to have an available bandwidth sufficient to carry at least N/K OC-1 signals.

Each of the M outputs of each source switching module 202-1 to 202-R are provided to an input of one of the M midstage modules 204-1, 204-2, 204-3, . . . , 204-M. Each of the M midstage switching modules 204-1 to 204-M in the midstage switching stage 204 can connect any input port to any output port. Each of the R inputs and R outputs of each of the midstage modules are configured and arranged to receive or transmit T accessible links, wherein each of the T accessible links has a bandwidth sufficient to carry the bandwidth of each of the groomed group of the OC-N component signals. Thus, there are M R×R midstage modules 204-1, 204-2, 204-3, to 204-M wherein each of the midstage switching modules receives as an input, one output from each of the R source stage switching modules 202-1 to 202-R. It should be understood that, in general, an OC-N circuit need not be divided evenly. For example, T=10 links can be used to carry an OC-48 circuit that can be broken down into N=48 component signals. In such a case some of the T links carry more component signals.

Each of the R outputs of each midstage switching module is provided to an input of one of the R M×L destination modules 206-1 to 206-R. Each of the R destination switching modules 206-1 to 206-R in the destination switching stage 206 can connect any input port to any output port. Each of the M inputs and L outputs of each of the destination switching modules are configured and arranged to receive or transmit T accessible links, wherein each of the T accessible links has a bandwidth sufficient to carry the bandwidth of each of the groomed group of component signals.

It can be shown that a three-stage CLOS network will not require network reconfiguration of the traffic to accommodate a new traffic request so long as all existing traffic and the new traffic request are routed by an appropriate spreading algorithm, i.e., the network is wide sense non-blocking if the following sufficient but not necessary condition is true:

$$\text{Ceiling}(G_i/M) \leq G_i/N. \quad (1)$$

Where $G_i$ is the individual bandwidth of the various input circuits, M is the number of output ports per source switching module, N is the number of input ports per source switching module, and the ceiling function is the smallest integer greater than or equal to the argument thereof. It can be further shown that a network is wide sense non-blocking if $M \geq N$ when every $G_i$ is a multiple of either M or N.

Figure 2A:
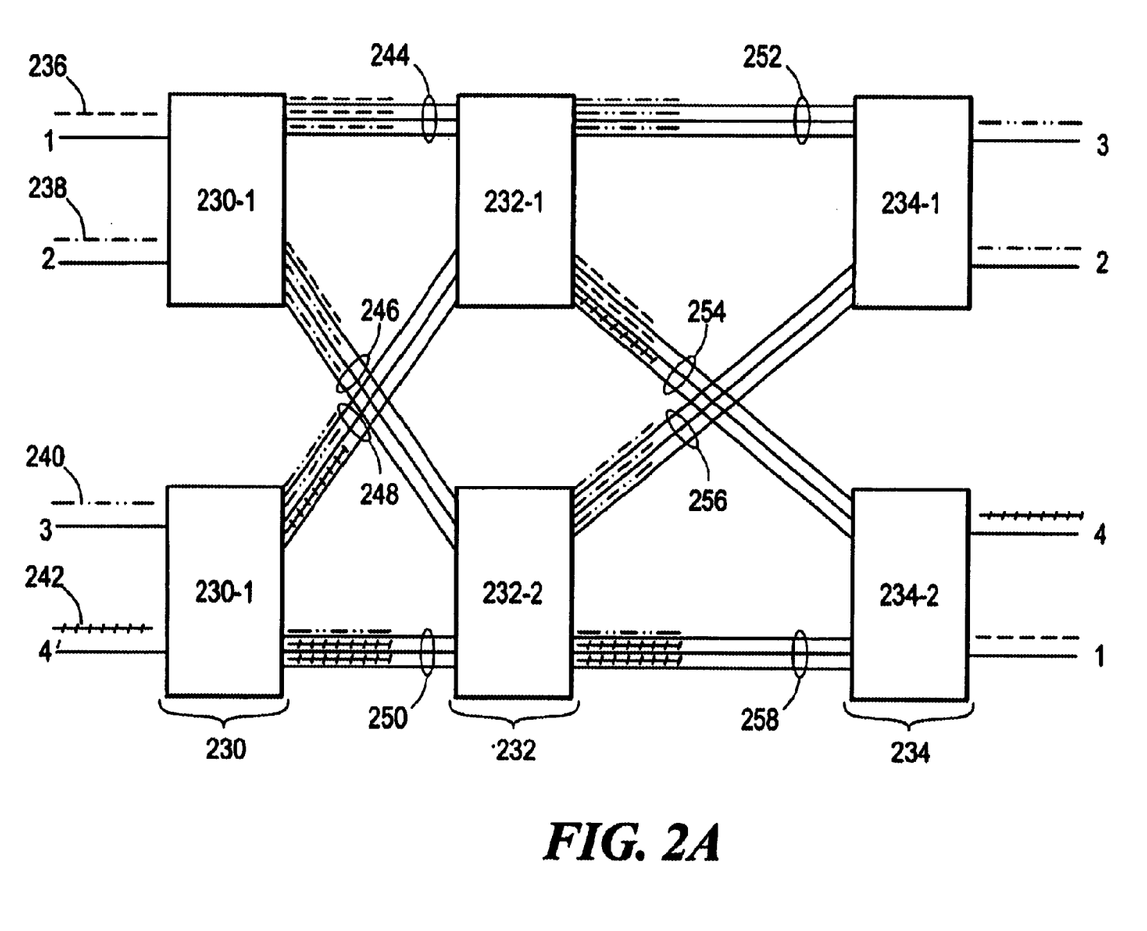
FIG. 2A is a schematic block diagram of an exemplary 3-stage CLOS network spreading four input signals through the network.

FIG. 2A illustrates an example of groomed input signals being spread over a number of connections between the source switching stage 230, the midstage switching stage 232, and the destination switching stage 234. As illustrated in FIG. 2A, the illustrated CLOS network includes a pair of groomed 2×2 source switching modules 230-1 and 230-2, a pair of groomed 2×2 midstage switching modules 232-1 and 232-2, and a pair of groomed 2×2 destination switching modules 234-1 and 234-2. Each of the switching modules in each stage includes two inputs and two outputs. Each of the two inputs of the source switching modules receives a unique OC-N signal identified by lines 236, 238, 240, and 242 respectively and are labeled as inputs 1, 2, 3, and 4 respectively. The signals exiting from the destination switching modules are also labeled and show the input signals exiting the CLOS network in a different order.

As illustrated in FIG. 2A, each input to the source switching modules 230-1 and 230-2 is groomed into three (3) component signals. Thus, each link between the various switching modules includes three (3) individually accessible connections. Thus for example, the groomed input signal 236 is spread between two (2) connections in link 244 and one (1) connection in link 246. The groomed input signal 238 is spread between two (2) connections in link 246 and one (1) connection in link 244. The groomed input signal 240 is spread between two (2) connections in link 248 and one (1) connection in link 250. The groomed input signal 242 is spread between two (2) connections in link 250 and one (1) connection in link 248.

At the midstage switching modules 232-1 and 232-2 the various component signals are again switched and spread over the individually accessible connections comprising the various links between the midstage switching modules 232-1 and 232-2 and the destination switching modules 234-1 and 234-2. In particular, each of the component signals need to be routed to arrive at the proper destination switching nodes to be switched to the appropriate output port and to be recombined into the original signal. Thus as illustrated in FIG. 2A, two (2) component signals of input signal 240 and one (1) component signal of input signal 238 are routed via link 252. Two (2) component signals of input signal 236 and one (1) component signal of input signal 242 are routed via link 254. Two (2) component signals of input signal 238 and one (1) component signal of input signal 240 are routed via link 256, and two (2) component signals of input signal 242 and one (1) component signal of input signal 236 are routed via link 258.

Each destination switching node 234-1 and 234-2 receives the various component signals of the input signals and recombines these signals in both time and order such that each output signals is present at the appropriate time in the appropriate order. Thus each of the input signals has been groomed into a plurality of component signals, spread throughout the various links between the source, midstage, and destination switching modules and recombined together at the output.

Figure 3:
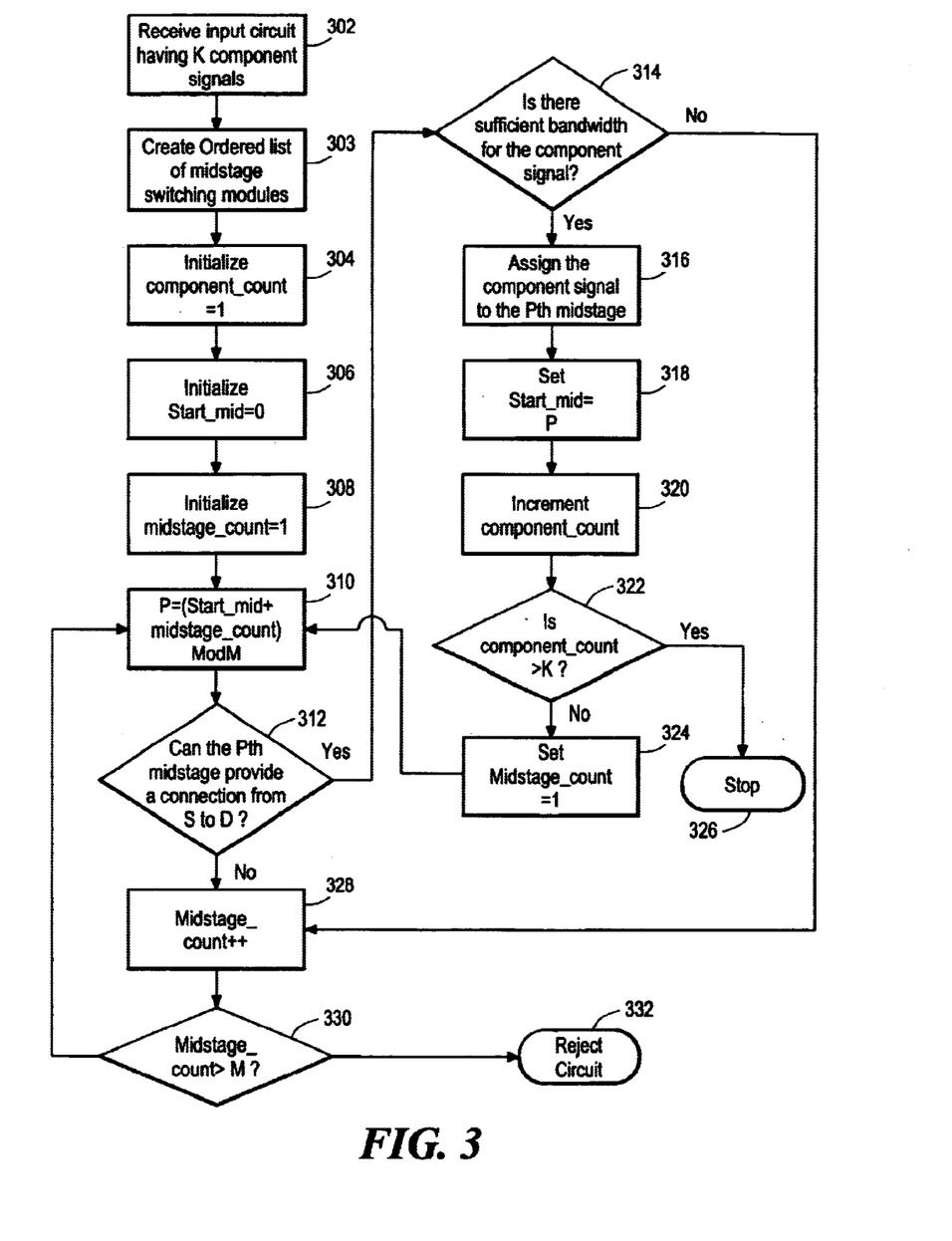
FIG. 3 is a flowchart depicting a method for spreading a signal through the CLOS network depicted in FIG. 2.

FIG. 3 provides a flowchart of a suitable spreading algorithm in which an ordered list of the midstage switching modules is developed and each midstage switching module is evaluated in that order. Each midstage switching module is evaluated as to having a connection between the source switching module and the destination switching module for each of the component signals of a unicast input circuit. In addition, each component signal includes a required bandwidth associated therewith, and a midstage switching module that has an available connection between the identified source and destination modules is further evaluated to ensure that the connection has a sufficient spare bandwidth to accept the component signal. For a dualcast or multicast input circuit the spare bandwidth to all of the destination modules is considered as described in more detail below.

The method illustrated in FIG. 3 includes, receiving an input circuit, which has a source module identifier and a destination module identifier, and wherein the input circuit includes K component signals, each of which has associated therewith a required bandwidth, as illustrated in step 302. An ordered list of the midstage switching modules is created, as illustrated in step 303. A component_count variable is initialized to one, a start_midstage variable is initialized to zero, and a midstage_count variable is initialized to one as illustrated in steps 304, 306, and 308 respectively. A variable P, which denotes the particular midstage switching module that is being evaluated, is set to a value of:

$$(\text{start\_midstage} + \text{midstage\_count}) \bmod M. \quad (2)$$

Where M is the number of midstage switching modules in the CLOS network, as depicted in step 310. The sum is evaluated Mod M such that if the start_midstage value is greater than zero, the variable P will wrap around and begin at the first midstage to ensure that all midstage switching modules are assessed. In the illustrative embodiment the first midstage module in the ordered list is depicted as the initial search searched. However, any midstage module in the ordered list may be used as the initial stage searched by setting the start_midstage variable to a value other than zero.

The $P^{th}$ midstage switching module is evaluated as to whether there is a connection between the source switching module S, which corresponds to the source identifier associated with the input circuit, and the destination switching module D, which corresponds to the destination identifier associated with the input circuit, as depicted in step 312. If there is a connection between the source switching module and the destination switching module, control is passed to step 314 and the amount of spare bandwidth available on the connection is evaluated. If there is sufficient spare bandwidth to pass the component signal corresponding to the component count, control passes to step 316. As illustrated in step 316, the component signal corresponding to the component_count is assigned to the $P^{th}$ midstage switching module. The start midstage variable is set to P and the component_count variable is incremented as depicted in steps 318 and 320. In this way the search for a midstage switching module for the next component signal will begin at the subsequent midstage module. If there is not sufficient bandwidth available in the connection, control is passed to step 328 which is detailed below.

As illustrated in step 322, the value of the component_count variable is compared to the number of component signals in the input circuit. If the component_count variable is greater than the number of component signals, K, in the input circuit, the algorithm stops, as illustrated in step 326 because all the component signals have been assigned midstage switching modules. If the component_count variable is less than or equal to the number of component signals in the input circuit, control is passed to step 324. As illustrated in step 324, the midstage_count is set equal to 1 so that the search for a midstage switching module for the next component signal will begin at the subsequent midstage switching module. Control is then returned to step 310.

At step 312, if the $P^{th}$ midstage switching module does not have a connection between the source and destination modules corresponding to the source identifier and destination identifier associated with the input circuit then control passes to step 328. Similarly as noted above, if the $P^{th}$ midstage switching module does not have the spare bandwidth to accommodate the component signal, control passes to step 328. As illustrated in step 328, the midstage_count variable is incremented, and as illustrated in step 330 the midstage_count is compared to the number of midstage switching modules, M. If the midstage_count is less than or equal to the number of midstage switching modules, M, then control is passed to step 310 to evaluate whether the next mid_stage module in the list can provide the connection. If the midstage_count is greater than the number of midstage switching modules M, indicating that all midstage modules have been tried, then control is passed to step 330. At this point the circuit is rejected because at least one of the components of the circuit can not be routed through the switch.

The above method illustrates an embodiment in which an input circuit is either accepted or rejected with no possibility of reconfiguring the switching network. In another embodiment, in the event that an input circuit is rejected, the network could be reconfigured to accommodate the new input circuit. Similarly, in the illustrated embodiment the evaluation of the midstage switching modules proceeds in a linear search pattern through the ordered list of midstage switching modules. In another embodiment, other searching patterns could be used, for example a random evaluation pattern could be used that tends to route component signals through different midstage modules.

In the event that the input circuit is a dualcast circuit, the algorithm of FIG. 3 can be combined with the midstage dualcast algorithm. In this embodiment, step 312 of FIG. 3 is altered to "Can the $P^{th}$ midstage provide a connection from the source switching module, S, to the first destination module, D1, and also provide a connection from the source switching module, S, to the second destination module, D2." More specifically, this means checking to see if the $P^{th}$ midstage has (1) a connection to S with sufficient unused bandwidth, (2) a connection to D1 with sufficient unused bandwidth, and (3) a connection to D2 with sufficient unused bandwidth. For a multicast input circuit, the process is repeated for each of the plurality of destination switching modules for each component signal. This is known as the midstage multicast method.

Alternatively, any dualcast request can be considered as two completely separate unicast requests, a first one from S to D1, another from S to D2. This is known as the first-stage dualcast method. Each is routed and spread independently. The routing/spreading pattern of one unicast may be different from that of the other. For each one, we can use FIG. 3 just as is for unicast requests. The only additional consideration is that if either unicast is rejected, then the other unicast is rejected as well, since they are actually the same dualcast request originally. Similarly, any multicast request can be considered as more than two separate unicast requests. This is known as the first-stage multicast method. In addition, it is possible to route a multicast request using a combination of first-stage multicast and subsequent midstage multicast, such that the combination reaches all destination modules.

In another embodiment, the component signals are spread among the various plurality of midstage switching modules according to a load balancing algorithm. A suitable load balancing algorithm is provided in FIG. 4.

Figure 4:
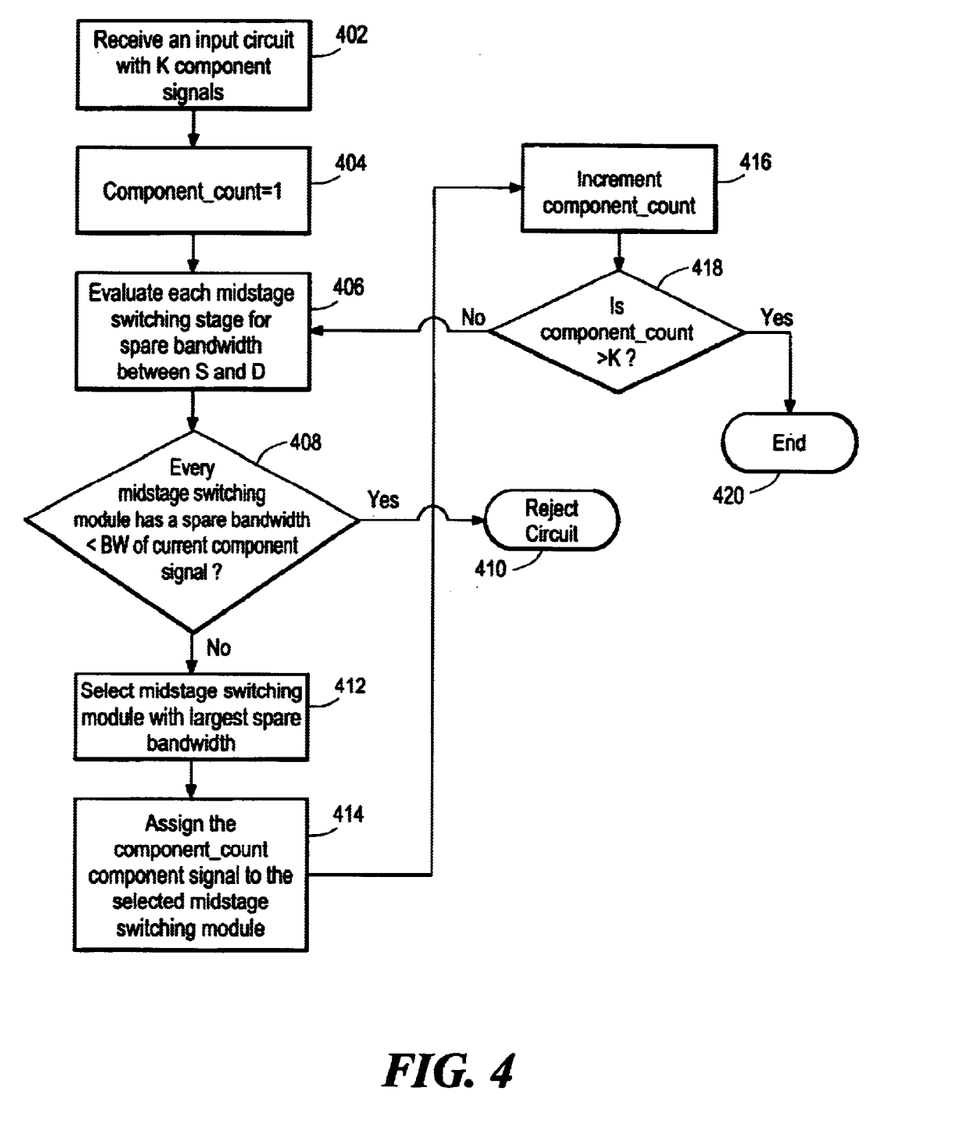
FIG. 4 is a flowchart depicting a method for load balancing and spreading a signal through the CLOS network depicted in FIG. 2.

As illustrated in FIG. 4, an input circuit is received, which has associated therewith a source module identifier and a destination module identifier. In addition, the input circuit includes K component signals, each of which has associated therewith a required bandwidth, as illustrated in step 402. The component_count variable is initialized to one, as illustrated in step 404. As illustrated in step 406, each midstage switching module is evaluated for the available bandwidth between the source switching module and itself, and the destination switching module and itself to determine if the available bandwidth is sufficient to pass the current input circuit. In one embodiment the available bandwidth is determined as the lesser of the unused bandwidth capacity between the source switching module and the midstage switching module and the unused bandwidth capacity between the midstage switching module and the destination switching module.

If every midstage switching module has a spare bandwidth less than that required of the current input circuit and greater than or equal to zero, the circuit is rejected, as illustrated in steps 408 and 410. Otherwise, the midstage switching module having the largest spare bandwidth is selected, as illustrated in step 412, and the component signal corresponding to the component_count value is assigned to the selected midstage switching module as illustrated in step 414. The component_count value is incremented and checked against the number of component signals comprising the input circuit, as illustrated in steps 416 and 418 respectively. If the component_count value is greater than the number of component signals, the process ends at step 420 as all the component signals have been routed. If the value of the component_count is less than the number of component signals, K, control is passed to step 406 to evaluate the midstage switching modules for the next component signal.

In the illustrated embodiment the available bandwidth metric is determined as a function of the signal traffic pattern in the three-stage CLOS network. In one embodiment, a simple algorithm is used such that each of the midstage switching modules can be evaluated and ranked. If a more complex function is used to determine the available bandwidth, it may be beneficial to establish which midstage switching modules have links between the source switching module and the destination switching module prior to determining the available bandwidth. In this way the complexity of determining the available bandwidth can be reduced if needed.

In an embodiment in which the various paths are ranked, it may be that by routing the first component signal, the spare bandwidth metric of the midstages may change. Accordingly, after the first component signal is assigned, it may be desirable to re-rank the midstages prior to the assignment of a subsequent component signal. The re-ranking process may be completed after each component signal is routed through the corresponding midstage, after a predetermined number of component signals have been routed, after a predetermined amount of bandwidth has been used by the previously routed component signals, after a predetermined amount of time as elapsed since the previous re-ranking, or a combination of factors may be used.

The algorithm depicted in FIG. 4 can be combined with the midstage dualcast method by altering step 406 to "Evaluate each midstage switching stage for spare bandwidth between the source module, S, the first destination module, D1, and the second destination module, D2." The spare bandwidth of each midstage is therefore a function of three values. The three values are (1) the unused bandwidth between S and the midstage, (2) the unused bandwidth between the midstage and D1, and (3) the unused bandwidth between the midstage and D2. One can select the function as described below. In the case where the input signal is a multicast signal, the number of values used in the function would be equivalent to the number of destination modules specified and the source module.

Alternatively, any dualcast request can be considered as two completely separate unicast requests, a first one from S to D1, another from S to D2. Each is routed and spread independently. This is known as the first-stage dualcast method. The routing/spreading pattern of one unicast may be different from that of the other. For each one, we can use FIG. 4 just as is for unicast requests. The only additional consideration is that if either unicast is rejected, then the other unicast is rejected as well, since they are actually the same dualcast request originally. A multicast request can be handled in a similar manner.

As discussed above, other functions of the traffic pattern in the three-stage CLOS network can be used to determine the available bandwidth between the source switching module, the midstage switching module, and the destination switching module. For example, the available bandwidth between the source and destination switching modules of each midstage switching module can be evaluated as the sum of the unused bandwidth capacity between the source switching module and the midstage switching module and the unused bandwidth capacity between the midstage switching module and the destination switching module. Alternatively, the available bandwidth between the source and destination switching modules of each midstage switching module is evaluated as the product of the unused bandwidth capacity between the source switching module and the midstage switching module and the unused bandwidth capacity between the midstage switching module and the destination switching module. Other arithmetic functions and combinations of the unused bandwidth capacity between the source switching module and the midstage switching module and the unused bandwidth capacity between the midstage switching module and the destination switching module may be used as well.

Those of ordinary skill in the art should further appreciate that variations to and modification of the above-described methods and apparatus for spreading a unicast, dualcast, or a multicast input circuit among one or more midstage switching modules of a 3-stage CLOS network may be made without departing from the inventive concepts disclosed herein. Accordingly, the invention should be viewed as limited solely by the scope and spirit of the appended claims.

What is claimed is:

1. A method for spreading an input signal through a three stage CLOS network, the input signal having associated therewith a source identifier and a destination identifier, the input signal further including a plurality of component signals each component signal having associated therewith a bandwidth requirement, the 3-stage CLOS network having a plurality of source modules coupled to a plurality of midstage switching modules that are coupled to a plurality of destination modules, the method comprising the steps of:

(1) receiving the input signal at a grooming source switching module corresponding to the source identifier;

(2) creating an ordered list of midstage switching modules;

(3) searching each of the plurality of midstage switching modules in the order of the ordered list for a first connecting midstage switching module having a first connection to the source module identified by the source module identifier associated with the input signal, and having a second connection from the midstage switching module to the destination module identified by the destination identifier associated with the input signal, the first and second connections each having an unused bandwidth greater than or equal to the bandwidth requirement associated with the first component signal;

(4) in the event that a first connecting midstage switching module is found for the first component signal, (a) searching, beginning with the subsequent midstage switching module on the ordered list, for a second connecting midstage switching module, having a first connection to the source module identified by the source module identifier associated with the input signal, and having a second connection from the midstage switching module to the destination module identified by the destination module identifier associated with the input signal, the first and second connections having an unused bandwidth greater than the bandwidth requirement of the second component signal; and (b) in the event that a second connecting midstage switching module is found for the second component signal, (i) routing the first component signal from the source module to the first connecting midstage switching module;

(ii) routing the second component signal from the source module to the second connecting midstage switching module;

(iii) routing the first component signal from the first connecting midstage switching module to the destination switching module; and (iv) routing the second component signal from the second connecting midstage switching module to the destination switching module.

2. The method of claim 1 further including the step in the event that first and second connecting midstage switching modules are found:

(4)(b)(v) recombining the first and second component signals into the input signal at the destination module.

3. The method of claim 1 further including the step of:

(4)(c) in the event that a second connecting midstage switching module is not found for the second component signal, rejecting the input signal.

4. The method of claim 1 further including the step:

(5) in the event that a first connecting midstage switching module is not found for the first component signal rejecting the input signal.

5. The method of claim 1 further including the steps of:

(3)(a) in the event that no first connecting midstage switching module is found, and in the event that not all of the plurality of midstage switching modules have been evaluated when the last midstage switching module in the ordered list is evaluated, and no first connecting midstage switching module is found, restarting the search from the first midstage switching module in the ordered list.

6. The method of claim 1 wherein the destination identifier includes first and second destination identifiers and wherein the method further comprises (5) repeating steps (1) to (4) for the second destination identifier.

7. The method of claim 6 wherein the destination identifier includes a plurality of destination identifiers and wherein step (5) further comprises repeating steps (1) to (4) for each of the plurality of destination identifiers.

8. The method of claim 1 further including the step of:

4(a)(i), in the event that no second connecting midstage switching module is found, and in the event that not all of the plurality of midstage switching modules have been evaluated when the last of the plurality of midstage switching modules in the ordered list is evaluated, restarting the search from the first midstage switching module of the ordered list.

9. The method of claim 1 wherein the destination identifier includes first and second destination identifiers and wherein the step (3) further comprises searching each of the plurality of midstage switching modules in the order of the ordered list for a fist connecting midstage switching module having a first connection to the source module identified by the source module identifier associated with the input signal, a second connection from the midstage switching module to the destination module identified by the first destination identifier associated with the input signal, and a third connection from the midstage switching module to the destination module identified by the second destination identifier associated with the input signal, each of the first, second, and third connections having an unused bandwidth greater than or equal to the bandwidth requirement associated with the first component signal, and wherein the step (4)(a) further includes;

(4)(a) searching, beginning with the subsequent midstage switching module on the ordered list, for a second connecting midstage switching module, having a first connection to the source module identified by the source module identifier associated with the input signal, a second connection from the midstage switching module to the destination module identified by the first destination module identifier associated with the input signal, and a third connection from the midstage switching module to the destination module identified by the second destination identifier associated with the input signal, the first, second, and third connections having an unused bandwidth greater than the bandwidth requirement of the second component signal.

10. The method of claim 9 wherein the destination identifier includes a plurality of destination identifiers and wherein the step (3) further comprises searching for a midstage switching module in the order of the ordered list for a first connecting midstage switching module having a first connection to the source module identified by the source module identifier associated with the input signal, and a plurality of destination connections each corresponding to the plurality of destination identifiers, wherein the first connection and each of the plurality of destination connections having an unused bandwidth greater than or equal to the bandwidth requirement associated with the first component signal, and wherein the step (4)(a) further includes searching, beginning with the subsequent midstage switching module on the ordered list, for a second connecting midstage switching module, having a first connection to the source module identified by the source module identifier associated with the input signal, and a plurality of destination connections each corresponding to the plurality of destination identifiers, wherein the first connection and each of the plurality of destination connections having an unused bandwidth greater than or equal to the bandwidth requirement associated with the first component signal.

11. The method of claim 1 wherein:

step (3) further includes identifying each of the plurality of the midstage switching modules having a connection to the source switching module and the destination switching module associated with the component signal and providing a first spare bandwidth metric corresponding to each of the first plurality of identified midstage switching modules;

step (4)(a)(i) further includes identifying each of the plurality of the midstage switching modules that can be the second midstage switching module and providing a second spare bandwidth metric corresponding to each of the second plurality of identified midstage switching modules;

step (4)(b)(i) further includes ranking the first and second spare bandwidth metrics of each of the first and second plurality of identified connecting midstage switching modules respectively and further includes routing the first component signal to the highest ranked midstage switching module of the first plurality of identified midstage switching modules; and step (4)(b)(ii) includes routing the second component signal to the highest ranked midstage switching module of the second plurality of identified midstage switching modules.

12. The method of claim 11 wherein the first and second spare bandwidth metric are each a function of the signal traffic pattern.

13. The method of claim 12 wherein the function of the signal traffic pattern is a combination of the unused bandwidth on each of the first and second connections.

14. The method of claim 13 wherein the combination of the unused bandwidth on each of the first and second connections is the sum of the unused bandwidths of the first and second connections.

15. The method of claim 13 wherein the combination of the unused bandwidth on each of the first and second connections is the sum of the squares of the unused bandwidths of the first and second connections.

16. The method of claim 13 wherein the combination of the unused bandwidth on each of the first and second connections is the product of the unused bandwidths of the first and second connections.

17. The method of claim 13 wherein the combination of the unused bandwidth on each of the first and second connections is the square root of the sum of the squares of the unused bandwidths of the first and second connections.

18. The method of claim 13 wherein the combination of the unused bandwidth on each of the first and second connections is the maximum of the first and second unused bandwidth metrics.

19. The method of claim 13 wherein the combination of the unused bandwidth on each of the first and second connections is the minimum of the first and second unused bandwidth metrics.

20. The method of claim 11 wherein the ranking of the first and second spare bandwidth metrics of each of the first and second plurality of identified connecting midstage switching modules is of a preselected subset of the first and second spare bandwidth metrics.

21. The method of claim 20 wherein the preselected subset of the first and second spare bandwidth metrics are those first and second spare bandwidth metrics having a value greater than predetermined first and second thresholds.

22. The method of claim 21 wherein the predetermined first and second thresholds are greater than or equal to the bandwidth requirement of the first and second signals respectively.

23. The method of claim 11 further comprising, subsequent to step 4(b)(ii), the step of re-ranking the first and second spare bandwidth metrics of the first and second plurality of identified connecting midstage modules.

24. The method of claim 1 wherein the input signal includes at least two input signals each of the at least two input signals having associated therewith a source identifier and a destination identifier, each of the input signals further including a plurality of component signals each component signal having associated therewith a bandwidth requirement:

(5) repeating steps (1) to (4) for each of the at least two input signals.

25. A method for spreading an input signal through a three stage CLOS network, the input signal having associated therewith a source identifier and a destination identifier, the input signal further including a plurality of component signals each component signal having associated therewith a bandwidth requirement, the 3-stage CLOS network having a plurality of source modules coupled to a plurality of midstage switching modules that are coupled to a plurality of destination modules, the method comprising the steps of:

(1) receiving the input signal at a grooming source switching module corresponding to the source identifier;

(2) randomly selecting one of midstage switching modules;

(3) evaluating the selected one of the plurality of midstage switching modules for a first connecting midstage switching module having a first connection to the source module identified by the source module identifier associated with the input signal, and having a second connection from the midstage switching module to the destination module identified by the destination identifier associated with the input signal, the first and second connections each having a bandwidth greater than or equal to the bandwidth requirement associated with the first component signal;

(4) in the event that a first connecting midstage switching module is found for the first component signal, (a) randomly selecting another midstage switching module, for a second connecting midstage switching module, having a first connection to the source module identified by the source module identifier associated with the input signal, and having a second connection from the midstage switching module to the destination module identified by the destination module identifier associated with the input signal, the first and second connections having a bandwidth greater than the than the bandwidth requirement of the second component signal; and (b) in the event that a second connecting midstage switching module is found for the second component signal, (i) routing the first component signal from the source module to the first connecting midstage switching module;

(ii) routing the second component signal from the source module to the second connecting midstage switching module;

(iii) routing the first component signal from the first connecting midstage switching module to the destination switching module; and (iv) routing the second component signal from the second connecting midstage switching module to the destination switching module.

* * * * *

UNITED STATES PATENT AND TRADEMARK OFFICE
CERTIFICATE OF CORRECTION

PATENT NO. : 6,754,208 B2
DATED : June 22, 2004
INVENTOR(S) : Anthony Chi-Kong Kam et al.

It is certified that error appears in the above-identified patent and that said Letters Patent is hereby corrected as shown below:

Column 6,
Line 5, "$M \geqq N$" should read -- $M >= N$ --.

Signed and Sealed this

Twenty-first Day of June, 2005

JON W. DUDAS
*Director of the United States Patent and Trademark Office*